US009529208B2

(12) United States Patent
Ando et al.

(10) Patent No.: US 9,529,208 B2
(45) Date of Patent: Dec. 27, 2016

(54) IMAGE STABILIZER

(71) Applicants: KAMAKURA KOKI CO., LTD., Saitama (JP); AI SYSTEMS, LTD., Saitama (JP)

(72) Inventors: Kunio Ando, Saitama (JP); Masashi Kato, Saitama (JP); Haruo Itoh, Kanagawa (JP)

(73) Assignees: KAMAKURA KOKI CO., LTD., Saitama (JP); AI SYSTEMS, LTD., Saitama (JP)

( * ) Notice: Subject to any disclaimer, the term of this patent is extended or adjusted under 35 U.S.C. 154(b) by 76 days.

(21) Appl. No.: 14/042,456

(22) Filed: Sep. 30, 2013

(65) Prior Publication Data
US 2014/0092476 A1 Apr. 3, 2014

(30) Foreign Application Priority Data

Oct. 1, 2012 (JP) .................................. 2012-219193
Feb. 4, 2013 (JP) .................................... 2013-19311
Sep. 26, 2013 (JP) ................................ 2013-199460

(51) Int. Cl.
*G02B 27/64* (2006.01)

(52) U.S. Cl.
CPC .................................. *G02B 27/646* (2013.01)

(58) Field of Classification Search
CPC ........... G02B 5/04; G02B 7/003; G02B 7/005; G02B 7/18; G02B 7/1805; G02B 26/08; G02B 26/0875–26/0891; G02B 27/64; G02B 27/646; G02B 27/648; G03B 2205/0007; G03B 2205/0023; G03B 2205/003; H04N 5/23251; H04N 5/23258; H04N 5/23264; H04N 5/2328; H04N 5/23283; H04N 5/23248

(Continued)

(56) References Cited

U.S. PATENT DOCUMENTS

2007/0047942 A1* 3/2007 Chang et al. ................. 396/133
2007/0159728 A1* 7/2007 Scura .................... G11B 5/5569
  360/264.9
2013/0194666 A1* 8/2013 Teroerde .............. G02B 27/644
  359/554

FOREIGN PATENT DOCUMENTS

JP 54023554 A 2/1979
JP 06250100 A 9/1994

(Continued)

OTHER PUBLICATIONS

Udagawa, JP 06-250100, Sep. 9, 1994, Machine Translated Mar. 4, 2015 via AIPN.*

(Continued)

*Primary Examiner* — Derek S Chapel
*Assistant Examiner* — Adam W Booher
(74) *Attorney, Agent, or Firm* — The Maxham Firm (57) ABSTRACT

An image stabilizer applicable to a monocular or binocular optical system. The stabilizer includes an erecting prism placed between an objective lens and an eyepiece to compensate for deterioration in a quality of an observed image caused by hands movement. The image stabilizer includes a gimbal suspension system having pivot shafts respectively extending to left and right sides of the optical axis of the optical system. The pivot shafts have a common pivot axis perpendicular to the optical axis. The gimbal suspension system has an erecting-prism holder supported by the pivot shafts, an angular velocity detector for detecting an angular displacement of the erecting prism, and a voice coil motor for pivoting the erecting-prism holder.

13 Claims, 6 Drawing Sheets

(58) Field of Classification Search
USPC ......... 359/196.1, 221.2, 221.3, 221.4, 226.2, 359/554, 557, 831, 833–837; 396/52, 53, 396/55; 348/208.99–208.8
See application file for complete search history.

(56) References Cited

FOREIGN PATENT DOCUMENTS

| | | |
|---|---|---|
| JP | 07043645 A | 2/1995 |
| JP | 10020213 A | 1/1998 |
| JP | 2006149001 A | 6/2006 |

OTHER PUBLICATIONS

Liu et al., "High Positioning Repeatability of Miniature Actuator," Sensors and Materials, vol. 20, No. 7, 2008, pp. 319-326.*
JP2006149001, English language machine translation, created Jul. 7, 2016.*

* cited by examiner

IMAGE STABILIZER

FIELD OF INVENTION

The present invention relates to art image stabilizer for a monocular and binoculars capable of compensating for deterioration in observed images, which is generated by changes in the angle of a beam emitted by an observed object to the optical axis of an optical device, which is caused by hands movement, due typically to movements of the optical device, such as a monocular or binoculars.

BACKGROUND OF THE INVENTION

When the user operates a telescope for optical observation, typical examples of which may include monoculars and binoculars, in order to watch an object, holding the device with her/his hands especially in an airplane or in a train, vibrations from the airplane or the train are brought to bear on the case of the telescope, which causes hands movement of the user. The hands movement causes a change in the angle of a beam emitted by the observed object to the optical axis of the telescope. As a result, the quality of the image of the observed object, or the optical image, may deteriorate in such a manner that the image is blurred, or the resolution of the telescope becomes apparently lowered. Even if the magnitude of the vibrations transmitted to the telescope, such as monoculars and binoculars, is small, the optical image that makes an appeal to the eyes deteriorates in the end. It is because telescopes have a narrow field of vision, the image produced by the objective lens is magnified by the eyepiece, and the magnified image is subjected to observation. Thus, as the magnifying power of a telescope becomes large, changes in the angle of a beam emitted by an observed object to the optical axis of the telescope and deterioration in the quality of the observed image, caused by factors such as vibrations, become unignorable.

So far have been proposed various image stabilizers to compensate for deterioration in the quality of an observed image caused by changes in the angle of a beam emitted by the observed object to the optical axis of the telescope, which changes are caused by hands movement of the user.

Patent document 1 discloses an image-stabilizing optical device, a conventional telescope with image stabilization. The device has optical systems comprising a left-and-right pair of objective lenses, a left-and-right pair of eyepieces, and a left-and-right pair of erecting prisms respectively arranged between the left objective lens and the left eyepiece, and between the right objective lens and the right eyepiece; a prism holder for holding the left-and-right pair of erecting prisms; a gimbal suspension system for rotatably supporting the prism bolder so as to allow rotation of the prism holder about two orthogonal axes in a plane that is perpendicular to the optical axis and located between the objective lenses and the eyepieces; and a gyro motor fixed to the gimbal suspension system.

The image-stabilizing optical device disclosed in patent document 1 holds a left-and-right pair of erecting prisms with a single prism holder. The prism holder is mounted on the gimbal suspension system that is driven by a single gyro motor. This structure is capable of simplifying the driving mechanism of the image-stabilizing optical device.

On the other hand, this device has a serious problem: When this image-stabilizing optical device attends to, for example, lateral movements of the optical device, the prism holder is pivoted around the middle position between the erecting prism in the left optical system and the erecting prism in the right optical system, or the vertical axis running through the intersection $\underline{O}$ in FIGS. 1 and 4 of patent document 1. This pivoting causes the erecting prism in the left optical system to move, for example, toward the objective lens, whereas the erecting prism in the right optical system is moved toward the eyepiece. Then, the distance between the objective lens and the erecting prism in the left optical system becomes different from the distance between the objective lens and the erecting prism in the right optical system. As a result, how an observed object is seen through the right optical system is different from how the same object is seen through the left optical system. In other words, this image-stabilizing optical device disclosed in patent document 1 makes the arrangement of the optical components in the right optical system different from that of the optical components in the left optical system, when it deals with lateral movements. This difference results in a difference between how an observed object is seen through the right optical system and how the same object is seen through the left optical system.

The image stabilizer disclosed in patent document 2 has the same optical systems as the image-stabilizing optical device disclosed in patent document 1: The stabilizer has a left-and-right pair of objective lenses; a left-and-right pair of eyepieces; a left-and-right pair of erecting prisms respectively arranged between the left objective lens and the left eyepiece, and between the right objective lens and the right eyepiece; a prism holder for holding the left-and-right pair of erecting prisms; a gimbal suspension system for rotatably supporting the prism holder so as to allow rotation of the prism holder about two orthogonal axes in a plane that is perpendicular to the optical axis and located between the objective lenses and the eyepieces; and an angular velocity detector, placed in the prism holder, for detecting the angle of rotation of the gimbal suspension system, which is caused by vibrations applied to the telescope. The stabilizer rotates the gimbal suspension system so as to return the system to a predetermined position based on the detected angle in order to correct blurred images caused by the vibrations.

The image stabilizer disclosed in patent document 2 employs, as an actuator of the gimbal suspension system, a driving mechanism including a rotating motor for rotating the shafts of the gimbal suspension system, in place of the gyro motor. Thus the image stabilizer is supposed to achieve weight saving and downsizing, and to reduce power consumption. When the image stabilizer has the same lateral vibrations as the image-stabilizing optical device disclosed in patent document 1, however, the arrangement of the optical components in the right optical system is different from that of the optical components in the left optical system. This image stabilizer does not resolve the difference between how an observed object is seen through the right optical system and how the same object is seen through the left optical system.

Patent document 3 discloses an optical device for observation, which is actually a pair of binoculars, comprising a left-and-right pair of objective lenses; a left-and-right pair of eyepieces; a left-and-right pair of variable-angle prisms respectively arranged between the left objective lens and the left eyepiece, and between the right objective lens and the right eyepiece; a sensor for detecting vibrations of the mainframe of the device; actuators for respectively driving the left variable-angle prism and the right variable-angle prism; and a controlling circuit for determining the amount of the angle that each actuator changes in relation to the vertical angle of the prism, depending on the vibrations.

Patent document 4 discloses image-stabilized binoculars, comprising a left-and-right pair of objective lenses; a left-and-right pair of eyepieces; a left-and-right pair of correcting lenses respectively arranged between the left objective lens and the left eyepiece, and between the right objective lens and the right eyepiece; a sensor for detecting vibrations of the mainframe of foe device; an actuator for simultaneously driving the left and right correcting lenses; and a controlling circuit for determining the travel distances that the actuator drives the correcting lenses, depending on the vibrations.

Although the image stabilizing methods disclosed in patent documents 3 and 4 advantageously make the mechanisms smaller, the amount of a change in the angle of a beam emitted by the observed object to the optical axis of an optical device that can be corrected by the methods is small compared with that of the change that can be corrected by the methods disclosed in patent documents 1 and 2. The latter methods are applicable to a wider variation of situations.

PRIOR ART DOCUMENTS

Patent Documents

Patent Document 1: JP S57-37852 B (1982)
Patent Document 2: JP H6-250100 A (1994)
Patent Document 3: JP H7-43645 A (1995)
Patent Document 4; JP H10-20213 A (1998)

SUMMARY OF EMBODIMENTS OF THE INVENTION

Problems to be Solved by the Invention

An objective of the present invention is to provide a small, light-weight, and inexpensive actuator for driving a gimbal suspension device which is one of the main elements of an image stabilizer to compensate for deterioration in the quality of an observed image caused by hands movement of the user, the image stabilizer applicable to a monocular or binocular optical system that comprises an erecting prism placed between an objective lens and an eyepiece, wherein the gimbal suspension system rotates the erecting prism about two orthogonal axes included in a plane that is perpendicular to the optical axis of the monocular or binocular optical system.

In more detail, the objective of the present invention is to provide an image stabilizer for a monocular and binoculars capable of compensating for deterioration in observed images, which is generated by changes in the angle of a beam emitted by an observed object to the optical axis of an optical device, which is caused by hands movement, due typically to movements of the optical device, such as a monocular or binoculars.

Means to Solve the Problems (1) As means for solving the aforementioned problem, an image stabilizer according to the present invention, applicable to a monocular or binocular optical system that comprises an erecting prism placed between an objective lens and an eyepiece, which image stabilizer compensates for deterioration in a quality of an observed image caused by bands movement of a user, the image stabilizer comprising:
 a gimbal suspension system fixed to a case in which the objective lens and the eyepiece are fixed, comprising pivot shafts respectively extending to left and right sides of an optical axis of the monocular or binocular optical system, which passes through the objective lens and the eyepiece, wherein the pivot shafts have a common pivot axis perpendicular to the optical axis;
 wherein the gimbal suspension system comprising an erecting-prism holder for holding the erecting prism, the erecting-prism holder supported by the pivot shafts so as to be pivotable around the common pivot axis; an angular velocity detector, fixed to the erecting prism or the erecting-prism holder, for detecting an angular displacement of the erecting prism caused by the hands movement; and a voice coil motor for pivoting the erecting-prism holder,
 wherein the voice coil motor comprises a first yoke to which a hollow coil is attached, wherein a position-sensitive device is placed at a center of the hollow coil; and a second yoke to which a permanent magnet is attached, wherein the permanent magnet produces a magnetic field whose lines of magnetic force are perpendicular to a face of the first yoke on which the hollow cod is attached; wherein the first yoke and the second yoke face each other with a predetermined gap in between, and the first yoke and the second yoke are movable in relation to each other.

(2) As further means for solving the aforementioned problem, an image stabilizer according to the present invention, applicable to a monocular or binocular optical system that comprises an erecting prism placed between an objective lens and an eyepiece, which image stabilizer compensates for deterioration in a quality of an observed image caused by hands movement of a user, the image stabilizer comprising:
 a gimbal suspension system fixed to a case in which the objective lens arm the eyepiece are fixed, comprising first pivot shafts respectively extending to left and right sides of an optical axis of the monocular or binocular optical system, which passes through the objective lens and the eyepiece, wherein the first pivot shafts have a first common pivot axis perpendicular to the optical axis, and second pivot shafts respectively extending upward and downward in relation to the optical axis, wherein the second pivot shafts have a second common pivot axis perpendicular to the optical axis;
 wherein the gimbal suspension system comprising an outer frame with one pair of the first and second pivot shafts, and an erecting-prism holder with the other pair of the first and second pivot shafts; an angular velocity detector, fixed to the erecting prism or the erecting-prism holder, for detecting an angular displacement of the erecting prism caused by the hands movement; and two voice coil motors respectively for pivoting the outer frame and the erecting-prism holder,
 wherein each of the voice coil motors comprises a first yoke to which a hollow coil is attached, wherein a position-sensitive device is placed at a center of the hollow coil; and a second yoke to which a permanent magnet is attached, wherein the permanent magnet produces a magnetic field whose lines of magnetic force are perpendicular to a face of the first yoke on which the hollow coil is attached; wherein the first yoke and the second yoke face each other with a predetermined gap in between, and the first yoke and the second yoke are movable in relation to each other.

(3) The image stabilizer according to means (1) or (2), wherein the face of the first yoke has a same shape as an opposite face of the permanent magnet attached to the second yoke.

(4) The image stabilizer according to means (1) or (2), wherein the first yokes and the second yokes are separate members.

(5) The image stabilizer according to means (2), wherein the first yoke of the one pair, with the hollow coil at the center of which the position-sensitive device is placed, is fixed to the outer frame of the gimbal suspension system, and the second yoke of the one pair, with the permanent magnet, is fixed to the case so as to face the first yoke of the one pair, and wherein the second yoke of the other pair, with the permanent magnet, is fixed to the erecting-prism holder, and the first yoke of the other pair, with the hollow coil at the center of which the position-sensitive device is placed, is fixed to the outer frame of the gimbal suspension system so as to face the second yoke of this other pair.

Advantages of the Invention

The image stabilizer according to the present invention is capable of compensating for deterioration in the quality of observed images caused by hands movement that acts on the optical device such as a monocular or binoculars. Furthermore, there is a little restriction on the design of the image stabilizer. The mechanism for driving the gimbal suspension system is simple, which reduces the production cost and the dimensions of the device. Thus the image stabilizer is applicable to other optical devices such as laser range-finding devices, and it is usable in a wide range of fields.

When this invention is applied to a pair of binoculars, each of the erecting prisms in the binocular optical systems is fixed to an individual gimbal suspension system. Thus another advantage of the present invention is that the invention is capable of providing an image stabilizer free of the technical problem associated with the devices that are disclosed in patent documents 1 and 2; when a single image stabilizer compensates for lateral movements, the stabilizer makes the arrangement of the optical components in the right optical system different from that of the optical components in the left optical system, which results in a difference between how an observed object is seen through the right optical system and how the same object is seen through the left optical system.

The image stabilizer according to the present invention employs a small voice coil motor or small voice coil motors with a sharpie structure to drive a gimbal suspension system in which an erecting prism is fixed. Thus the invention is applicable to simplified telescopes and binoculars that compensate for deterioration in the quality of observed images caused only by movements in the vertical directions.

The image stabilizer of the invention, including an outer pair of first and second yokes and an inner pair of first and second yokes, is capable of simplifying the wiring of cables for driving signals: The first yoke of the outer pair, with a hollow coil having a position-sensitive device at the center thereof, is fixed to the outer frame of the gimbal suspension system, and the second yoke of the outer pair, with a permanent magnet, is fixed to the case; the second yoke of the inner pair, with a permanent magnet, is fixed to the outer frame of the erecting prism holder of the gimbal suspension system, and the first yoke of the inner pair, with a hollow coil having a position-sensitive device at the center thereof, is fixed to the outer frame of the gimbal suspension system.

BRIEF DESCRIPTION OF THE DRAWINGS

FIGS. 3(a)-3(d) are schematic diagrams illustrating the driving principle of a voice coil motor to be incorporated into the image stabilizer of the present invention.

DETAILED DESCRIPTION OF EMBODIMENTS OF THE INVENTION

Figure 1:
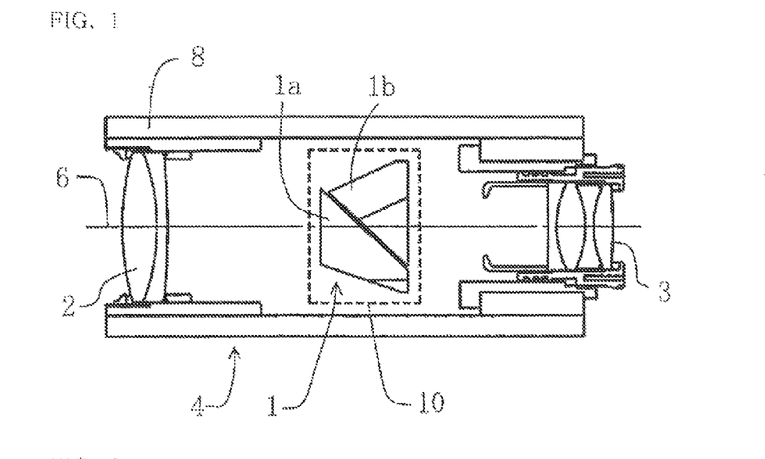
FIG. 1 is a schematic illustration showing an image stabilizer of the present invention to be applicable to a monocular.
Figure 2:
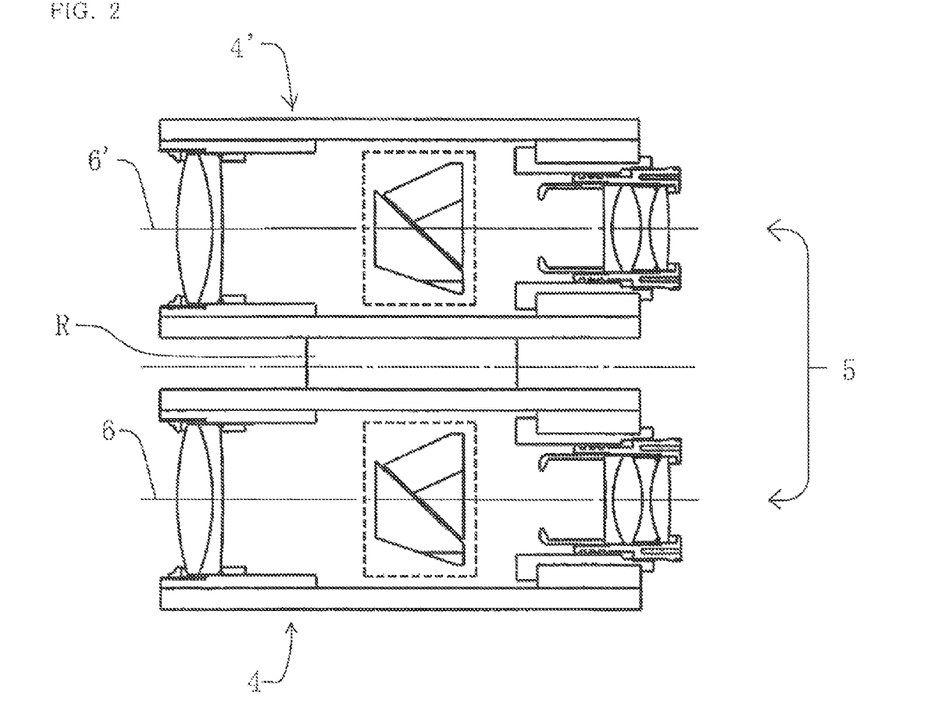
FIG. 2 is a schematic illustration showing an image stabilizer of the present invention to be applicable to a pair of binoculars.

FIG. 1 shows an example of the image stabilizer of the present invention that is applied to a monocular. FIG. 2 shows an example of the image stabilizer of the present invention that is applied to a pair of binoculars.

As shown in, for example, FIG. 1, the image stabilizer according to the present invention has a gimbal suspension system 10, which is rotatably mounted to a case 8. To the gimbal suspension system is fixed an erecting prism 1, which is placed between an objective lens 2 and an eyepiece 3 of a monocular optical system 4 with an optical axis 6, wherein the objective lens and the eyepiece are fixedly accommodated in the case 8. Thus when hands movement acts on the case 8, the erecting prism is capable of remaining at the initial position where the prism has been located before affected by the hands movement.

When the image stabilizer of this invention is applied to a pair of binoculars, a pair of image stabilizers 4, 4' each for a monocular are incorporated into a pair of binoculars 5, which are made by connecting the monoculars with a connecting member R in such a manner that the optical axes 6, 6' of the respective monoculars are parallel with each other, as shown in, for example, FIG. 2.

The image stabilizer of the present invention is applicable to both of the monocular and the binoculars. The optical system of the monocular to which the image stabilizer is applied, as shown in FIG. 1, is the same as each of the optical systems of the binoculars to which the image stabilizers are applied, as shown in FIG. 2. Thus, we will explain the image stabilizer in detail in the following, taking the stabilizer for a monocular as an example.

The image stabilizer according to the present invention has a voice coil motor as driving means for pivoting a gimbal suspension system to which an erecting prism is fixed, the gimbal suspension system employed to compensate for deterioration in the quality of observed images caused by vibrations or movements given to the case of optical device. The voice coil motor has a first yoke and a second yoke wherein the two yokes are detached and arranged so as to face each other, as we will explain it hereinafter. The first yoke is provided with a hollow coil with a position-sensitive device at the center thereof for detecting the position of the gimbal, an example of which is a magnetic induction device. The second yoke is provided with a permanent magnet. The first and second yokes are arranged in such a manner that they face each other with a predetermined gap in between. The voice coil motor has such a structure as to enable the first and second yokes to move in relation to each other.

The present invention realizes rotary or pivoting motion of the gimbal suspension system through the incorporation of a voice coil motor, which is normally used to drive an object along a straight line, into the gimbal suspension system.

Examples of the erecting prism 1 may include Schmidt prisms and Abbe prisms. A Schmidt erecting prism is shown in FIG. 1. The Schmidt erecting prism 1 has a first prism 1a and a second prism 1b, and the second prism 1b has a roof prism section. Thus the optical axis of an incoming ray and that of an outgoing ray are coaxial, or aligned in a line. The following explanation is made with respect to the Schmidt erecting prism.

Figure 5:
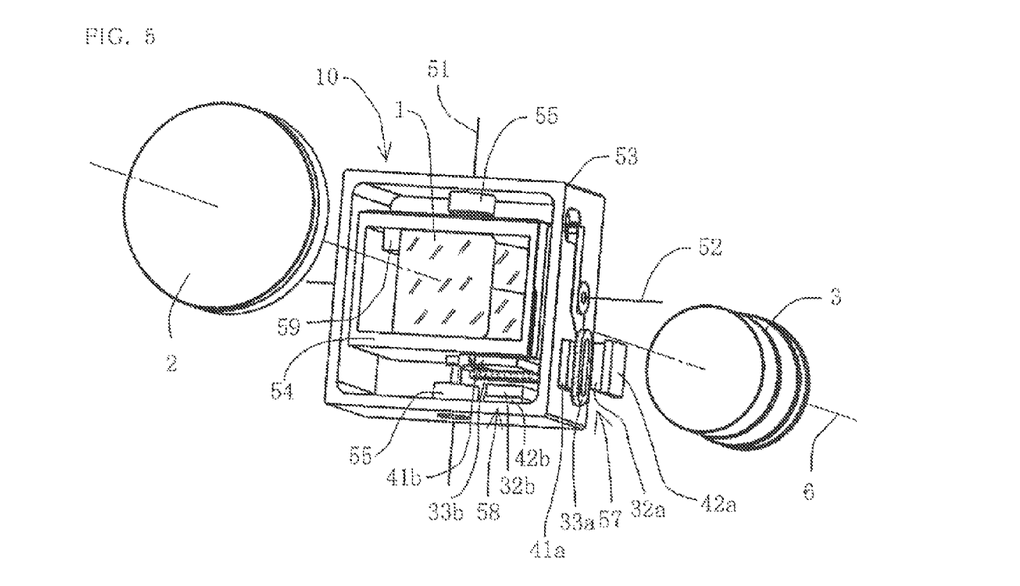
FIG. 5 is a schematic perspective view of a principal part of the image stabilizer shown in FIG. 1, which is an example of the image stabilizer according to the present invention.

The gimbal suspension system 10 shown in FIG. 1 has lateral shafts 52, perpendicular to the optical axis 6, and vertical shafts 51, also perpendicular to the optical axis, as shown in FIG. 5. The intersection of the second common axis of the vertical shafts 51 and the first common axis of the lateral shafts 52 and the optical axis 6 is at the midpoint between the objective lens and the eyepiece. In other words, the intersection is at a point displaced half of the sum total $\underline{S}$ of the distance $\underline{L}$ between the objective lens 2 and the entry face of the erecting prism 1, the physical measure $\underline{M}$ from the entry face to the exit face of the erecting prism 1, and the distance $\underline{N}$ between the exit face of the erecting prism 1 and the eyepiece 3, which is represented by S=L+M+N, from either the objective lens 2 or the eyepiece 3. The objective lens and the eyepiece of an actual monocular each consist of a few or several lenses with a thickness. Therefore, precisely, the intersection of the first and second common axes of the gimbal suspension system is at a point displaced half of the sum total of the distance between the posterior principal point of the objective lens 2 and the entry face of the erecting prism 1, the physical measure from the entry face to the exit face of the erecting prism 1, and the distance between the exit face of the erecting prism 1 and the anterior principal point of the eyepiece 3, from either of the posterior principal point of the objective lens 2 or the anterior principal point of the eyepiece 3. An explanation of the principle of how the image stabilizer with an erecting prism works is omitted, because it is explained in patent document 1.

Conventional image stabilizers employ a rotating motor to drive the shaft from which the gimbal hangs and a position-sensitive device, such as a potentiometer, to drive the gimbal suspension system. However, the rotating motor necessary to drive the shaft is relatively large compared with the frame of the gimbal. This larger size of the rotating motor, combined with limitations on the place to which the motor is attached and on the shape of the motor including the diameter and thickness thereof, is an obstacle to downsizing and weight saving of the image stabilizer. This invention employs a voice coil motor comprising a first yoke 41 and a second yoke 42 in the shape of a pair of relatively thin plates, with a position-sensitive device 36 incorporated into the voice coil motor. The employment of a voice coil motor with this structure enables the user to select a place to attach the voice coil motor at will. As a result, the image stabilizer of the present invention, once incorporated into an optical device, enhances the degree of freedom in design and achieves weight saving.

FIG. 3 shows an example of general voice coil motors. FIG. 3(a) is a sectional view of the voice coil motor. FIG. 3(b) a plan view thereof, FIG. 3(c) a plan view showing the structure of a permanent magnet usable in the voice coil motor, and FIG. 3(d) a side view thereof.

As understood from FIG. 3, a generally known voice coil motor has a fixing yoke 31 with a U-shaped iron core, a permanent magnet 32 fixed to one of the opposite inner faces of the fixing yoke 31, a hollow coil 33 movable in a gap 34 defined by the permanent magnet and the other of the opposite inner faces, and a position-sensitive device 36 arranged at the center of the hollow coil 33. Reference numeral 35 denotes a support, such as a printed board, for supporting the hollow coil.

Figure 3A:
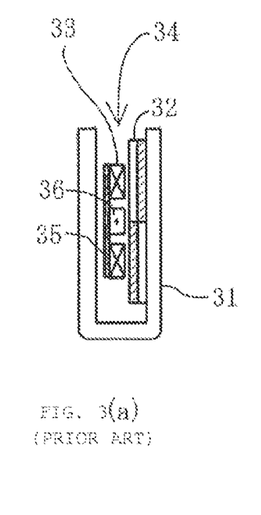
FIG. 3(a) is a sectional view of the voice coil motor, FIG. 3(b) a plan view of the voice coil motor, FIG. 3(c) a plan view of a permanent magnet incorporated into the voice coil motor, and FIG. 3(d) a side view of the permanent magnet.
Figure 3B:
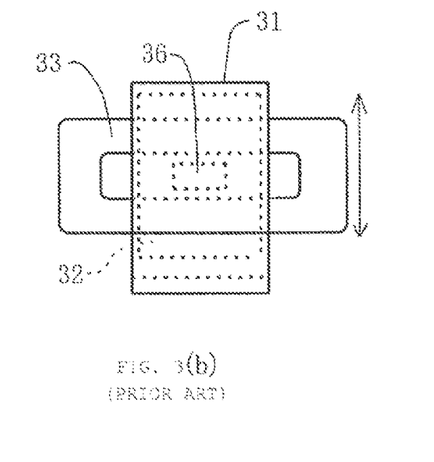
Figure 3C:
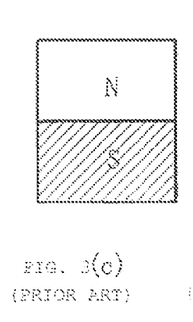
Figure 3D:
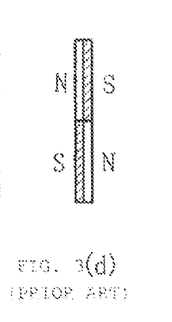

As shown in FIGS. 3(c) and 3(d), the permanent magnet is a plate-like strong magnet. A metal piece for the magnet is magnetized along the depth thereof in such a manner that different poles are created on the sides of the plate with a central portion of the plate as a border.

This permanent magnet 32 is fixed to one of the inner faces of the fixing yoke 31 in such a manner as that shown in FIG. 3(a). Then, the magnetic field in the fixing yoke 31 exerts magnetic forces in opposite directions, each perpendicular to the opposite faces of the fixing yoke 31 arranged with the gap 34 in between, on the respective sides of the central portion across which the hollow coil 33 moves.

Thus, when an electric current is allowed to flow through the hollow coil 33, which is arranged, as shown in FIG. 3, in the fixing yoke 31 with the magnetic field described in the preceding paragraph, the hollow coil 33 is capable of moving along an arrow in FIG. 3(b), depending on the direction of the electric current.

When an object to be moved, which is not shown in the figures, is connected with the support 35 for supporting the hollow coil 33, the object is capable of being driven along a straight line.

The magnetic induction device such as a Hall element or a magnetic sensor, as position-sensitive device 36, which is placed at the center of the hollow coil 33, detects the position of the hollow coil 33 while it is moving and outputs a position-detecting signal.

Figure 4:
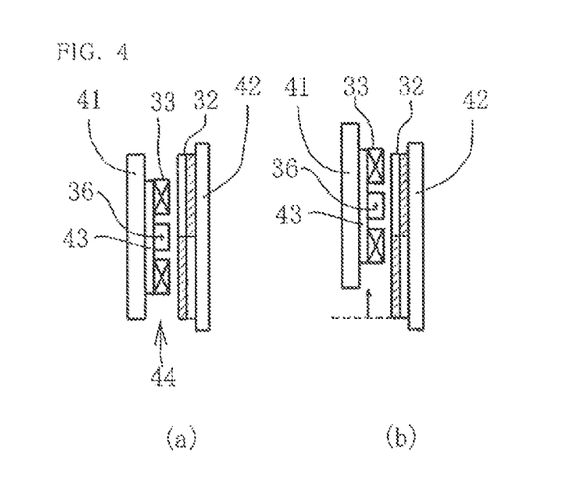
FIG. 4(a) is a schematic sectional diagram illustrating the structure and driving principle of a voice coil motor with separate yokes, which is suitably employed in the image stabilizer of the present invention, showing the voice coil motor.
FIG. 4(b) is a schematic sectional diagram of FIG. 4(a) showing a state in which the hollow coil is moved translationally with respect to tire coil position shown in FIG. 4(a), keeping a predetermined distance to the permanent magnet.

A voice coil motor suitably applicable to the present invention has, in place of the U-shaped fixing yoke explained hereinbefore, two separate yokes each in the shape of a plate, a first yoke 41 and a second yoke 42, arranged in such a manner that they face each other, as shown in FIG. 4(a). The first yoke 41 is provided with a hollow coil 33 with a position-sensitive device 36 for detecting the position of the first yoke, such as a magnetic sensor, at the center of the hollow coil 33. The second yoke 42 is provided with a permanent magnet 32 in the shape of a plate. The first yoke and the second yoke are arranged so that they face each other with a predetermined gap 44 in between, and the first yoke 41 and the second yoke 42 are movable in relation to each other. The permanent magnet 32 shown in FIG. 4 is essentially the same as the magnet 32 shown in FIG. 3.

The hollow coil 33 is fixed to the first yoke 41 with the aid of a support 43 to which the position-sensitive device 36 is also attached. When an electric current is allowed to flow through the hollow coil 33, the first yoke 41 integrated with the hollow coil 33 becomes a moving part its the case where the second yoke 42 is a stator, and moves in the direction decided by the direction of the electric current. The first yoke moves, for example, along the arrow shown in FIG. 4(b).

On the other hand, when the first yoke 41 is made a stator, the second yoke 42 with the permanent magnet, as a moving part, moves in relation to the first yoke. As mentioned in the preceding paragraph, when the second yoke 42 is made a stator, the first yoke 41 moves as a moving part.

The face of the first yoke 41 opposite the second yoke 42 should have a same planar shape as the permanent magnet 32 opposite the first yoke 41 in the embodiment shown in FIG. 4. In that case, the first yoke 41 faces the second yoke 42 with the centers of their opposite faces aligned when no electric current flows through the hollow coil, as shown in FIG. 4(a). This locational relationship stabilizes the respective initial positions of the first yoke 41 and the second yoke 42. Although the face of the first yoke 41 should preferably have a same shape as that of the permanent magnet 32 opposite the first yoke 41, it is not necessary for the face of the first yoke and that of the permanent magnet to have exactly a same shape as long as the yokes have the locational relationship when the electric current is off.

Figure 6:
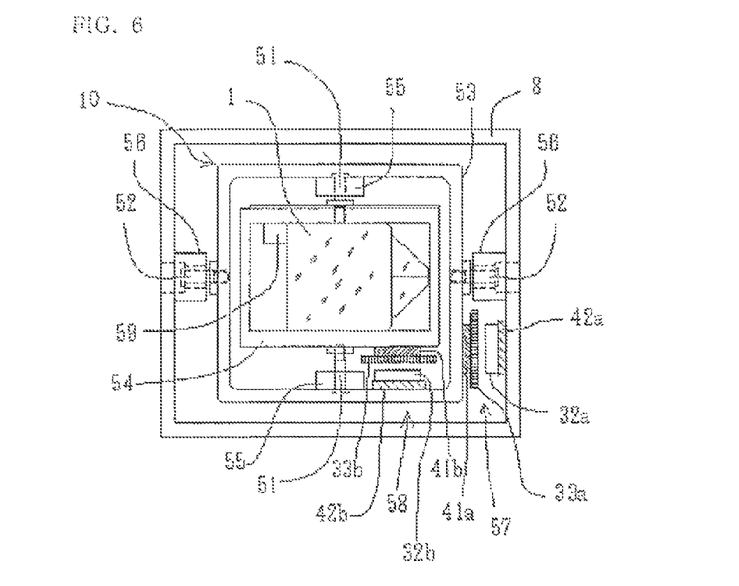
FIG. 6 is an end view of the gimbal suspension system shown in the perspective view of FIG. 5, the end view seen from the side of the objective lens.

FIG. 5 is a perspective view showing a principal part of the monocular shown in FIG. 1. FIG. 6 is an end view of the gimbal suspension system shown in FIG. 5, seen from the side of the objective lens. This end view may also be regarded as a front view. The case 8 shown in FIG. 1 is omitted in FIG. 5, which reduces complexity in the figure.

In FIGS. 5 and 6, the gimbal suspension system 10, in the shape of a first general square frame in the front view of FIG. 6, has an outer frame 53 with first pivot shafts 52 that extend in both lateral directions, or to respective left and right sides of the optical system, and an erecting prism holder 54 in the shape of a second general square frame with such dimensions that the erecting prism holder is accommodated in the fame of the outer frame 53, the erecting prism holder having second pivot shafts 51 that extend in both vertical directions, or upward and downward respectively in relation to the optical system, wherein the erecting prism 1 is fixed to the inside of the erecting prism holder 54, which is mounted inside the outer frame 53. The second pivot shafts 51 of the erecting prism holder 54 are received in second bearings 55 provided in the outer frame 53, so that the erecting prism holder 54 turns around the second pivot shafts 51. Also, the first pivot shafts 52 of the outer frame 53, which extend to the respective left and right sides in the figures, are received in first bearings 56 fixedly provided in the case 8, so that the outer frame 53 turns around the first pivot shafts 52 that extend horizontally.

In the example shown in FIGS. 5 and 6, the outer frame 53 of the gimbal suspension system 10 has lateral pivot shafts 52 and the erecting prism holder 54 has vertical pivot shafts 51. However, a gimbal suspension system with an outer frame with vertical pivot shafts and an erecting prism holder with lateral pivot shafts will bring about the same advantages of the present invention. Thus such gimbal suspension systems also are also included in the scope of the technology of the present invention.

Two voice coil motors, each of which has the separate yokes, as we have explained hereinbefore referring to FIG. 4, are used to turn the erecting prism holder 54 and the outer frame 53 of the gimbal suspension system 10. A first voice coil motor 57 to drive the outer frame 53 has a first yoke 41a with a hollow coil 33a fixedly attached to the outer side of a right vertical board of the outer frame 53, and a second yoke 42a with a permanent magnet 32a fixedly attached to the case 8 so that the second yoke faces the first yoke, as shown in FIG. 6.

A second voice coil motor 58 to drive the erecting prism holder 54 has a first yoke 41b with a hollow coil 33b fixedly attached to the lower side of a lower lateral board of the erecting prism holder 54, and a second yoke 42b with a permanent magnet 32b fixedly attached to the upper side of a lower lateral board the outer frame 8 so that the second yoke faces the first yoke, as shown in FIG. 6.

A biaxial angular velocity sensor 59 that detects and outputs the angular velocity of the erecting prism, to which FIG. 5 should be referred, is attached to the erecting prism holder 54 of the gimbal suspension system, or the erecting prism 1 held in the erecting prism holder 54.

The voice coil motors used in the image stabilizer of the present invention are driven based on angular velocities detected by the biaxial angular velocity sensor 59, and the angular position around the horizontal axis and the angular position around the vertical axis detected by the angular position-sensitive devices 36 (shown in FIG. 4) placed in the hollow coils of the voice coil motors. The voice coil motors are driven by the vertical and lateral voice coil motor-driving circuits, shown in FIG. 7.

The operation of the image stabilizer driven by the gimbal suspension system will be explained in more detail. The erecting prism rotates and goes away from the original position on the optical axis because of hands movement of the user. The amount of movement of the erecting prism is calculated based on the information about the angular velocity detected by the angular velocity detector attached to the erecting prism or the electing prism holder and the amounts of angular displacement of the erecting prism detected by the position-sensitive devices, such as angular position-sensitive devices, which are placed in the hollow coils of the voice coil motors. The voice coil motors are driven based on the calculated amount. The amount of movement of the erecting prism is thus compensated, and the position of the erecting prism at the initial location is maintained.

Figure 7:
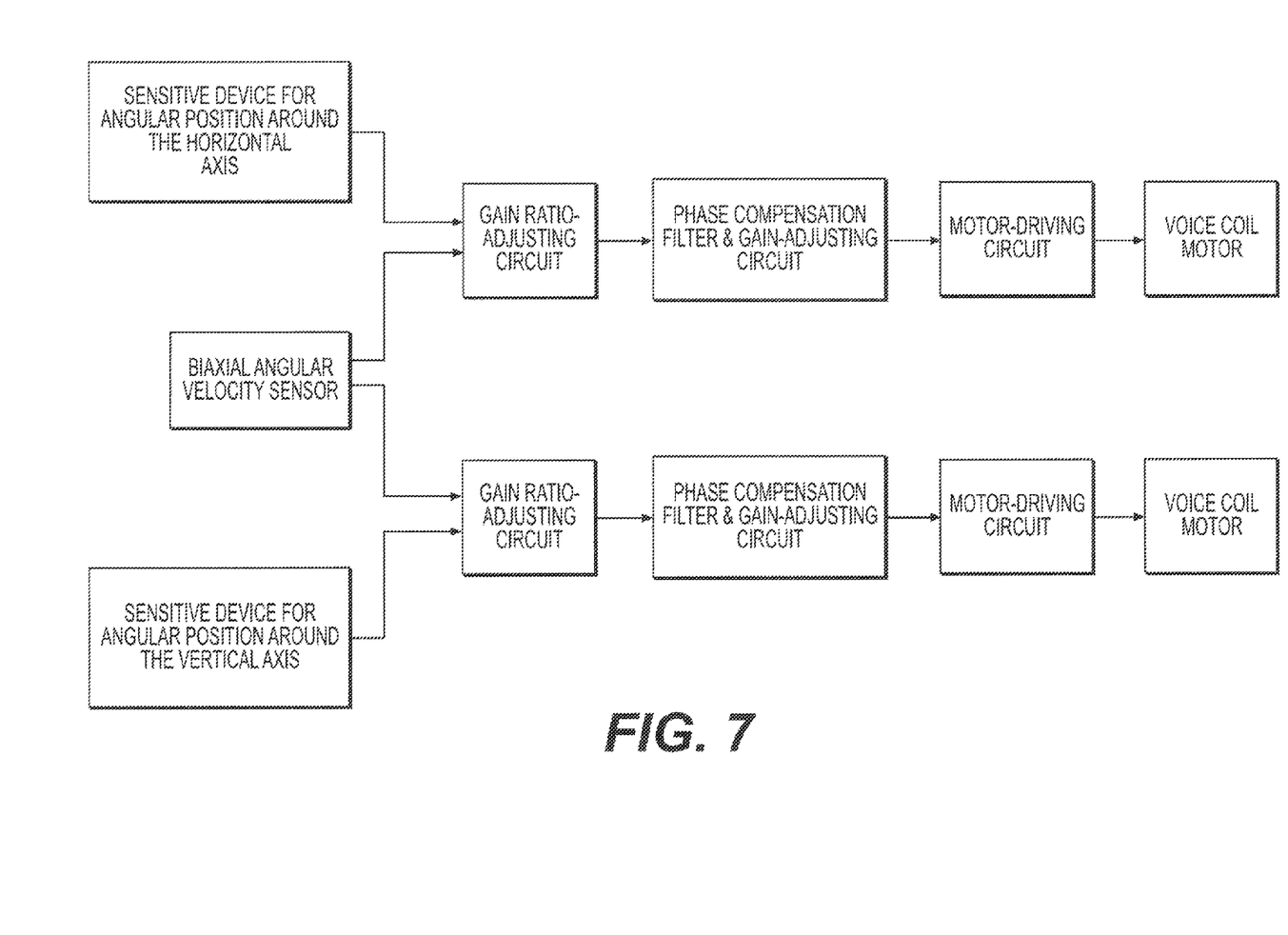
FIG. 7 is a block diagram that shows driving circuits for driving the voice coil motor based on information outputted by the angular velocity detecting device (or angular velocity sensor) and by the position-sensitive device (or position sensor).

Based on the gain of an angular velocity feedback loop for the angular velocities detected by the biaxial angular velocity sensor and the gain of positioning feedback loops for the angular positions detected by the position-sensitive devices placed in the voice coil motors that drive the gimbal suspension system around the lateral axis and the vertical axis, a gain ratio-adjusting circuit in FIG. 7 is designed to adjust the ratio of the gain of the angular velocity feedback loop to that of the positioning feedback loops, so that the image stabilizer will have properties suitable for a monocular. When the gain of the entire circuit is made too large, the circuit may oscillate and the energy may be discharged as sound or heat, which is a wasteful consumption of energy. In order to avoid such wasteful consumption, phase compensation filters and the gain-adjusting circuits adjust the gain of the closed loops so that the circuit will not oscillate and also modify the properties of the inters to improve the responsiveness, the residual deviation, and the phase margin. The circuits for driving the voice coil motors may employ motor drive IC's in which the efficiency of power-source utilization is improved by using a bridged transformerless (BTL), by employing a MOSFET with a small saturation voltage for the output configuration of the H-bridges, or by controlling the power supply to the circuits by pulse-width modulation (PWM).

Although a biaxial angular velocity sensor is used for the driving circuit, a total of two monoaxial angular velocity sensors may be used; one is for the erecting-prism holder and the other for the outer frame.

The erecting prism, which is pivotably placed between the objective lens and the eyepiece and supported by the image stabilizer that we explained referring to FIG. 1, has a pivot angle of small degrees such as about 5 degrees. Thus voice coil motors such as the motor that has been explained hereinbefore can be effectively employed for the driving device of the gimbal suspension system.

When a voice coil motor with separate yokes, such as the one that we explained referring to FIG. 4, is used for the driving device of the gimbal suspension system, either of the first yoke with the hollow coil or the second yoke with the permanent magnet may be used as a stator or as a moving part. Thus voice coil motors of this type provide the image stabilizer with several options for the places to which the motors are attached or with several structural variations, which makes flexibility of the design large; a voice coil motor with separate yokes is highly useful. In particular, the voice coil motor with separate yokes jest requires a small place to which the motor is attached, yet it is capable of realizing the pivoting movement of the gimbal suspension system. Therefore the voice coil motor with separate yokes is capable of reducing the size of the image stabilizer as well as that of an optical device in which this image stabilizer is incorporated. Furthermore, if a position-sensitive device is attached to the voice coil motor, it is capable of reducing the size of the voice coil motor per se.

Figure 8:
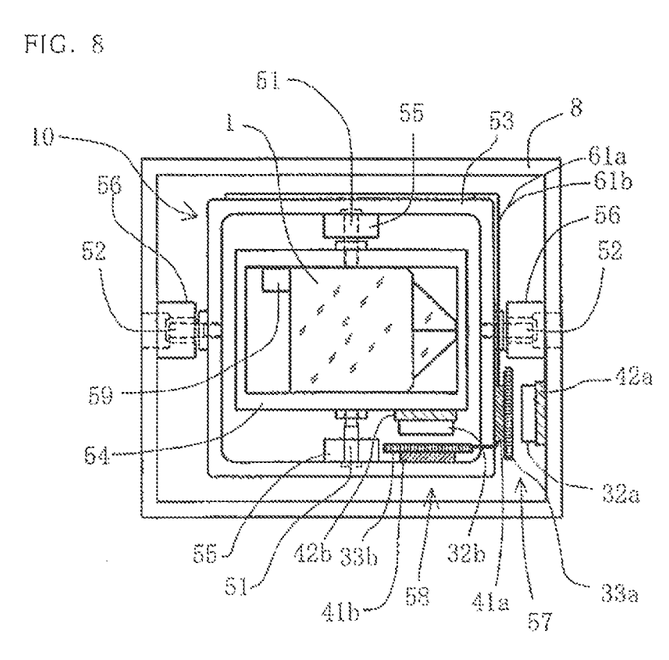
FIG. 8 is an end view showing another example of how the voice coil motors are fixed to the gimbal suspension system shown in FIGS. 5 and 6.

Another example of the image stabilizer with two voice coil motors to drive the gimbal suspension system is shown in FIG. 8. As shown in this figure, a voice coil motor 57 for driving the outer frame 53 of the gimbal suspension system 10 has a second yoke 42a with a permanent magnet 32a, and the second yoke as a stator is fixed to the case 8. A first yoke 41a with a hollow coil 33a, as a moving part, is fixed to the outer frame 53 in such a manner the first yoke with the hollow coil faces the permanent magnet with a predetermined space in between. A voice coil motor 58 for driving the erecting-prism holder 54 of the gimbal suspension system 10 has a second yoke 42b with a permanent magnet 32b, and the second yoke as a moving part is fixed to the erecting-prism holder 54. A first yoke 41b with a hollow coil 33b, as a stator, is fixed to the outer frame 53 in such a manner the first yoke with the hollow coil 33b faces the permanent magnet 32b with a predetermined space in between.

In the image stabilizer provided with the voice coil motors shown in FIG. 8, power lines 61a through which electric power is sent from voice coil motor-driving circuits to the corresponding hollow coils 33a and 33b, and position signal lines 61b which are connected respectively with the position sensitive devices (not shown in the figure) placed at the center of the hollow coils 33a and 33b are arranged together on the outer frame 53. In other words, the lines are capable of being gathered only on the outer frame of the gimbal suspension system. Thus, as shown in FIG. 8, the lines to the erecting-prism holder 54 do not cross the lines to the outer frame 53, so that the lines can be compactly and easily assembled. This gathering of the lines makes the assembly of the system easy and enhances reliability.

As disclosed in patent document 1, vibrations and movements given to the monocular or pair of binoculars are mostly those in vertical directions or in upward and downward directions. Therefor only a compensation for deterioration of the quality of an observed image resulting from vertical movements of the hands will lead to the production of an image stabilizer, which is simplified yet suited to practical use.

Figure 9:
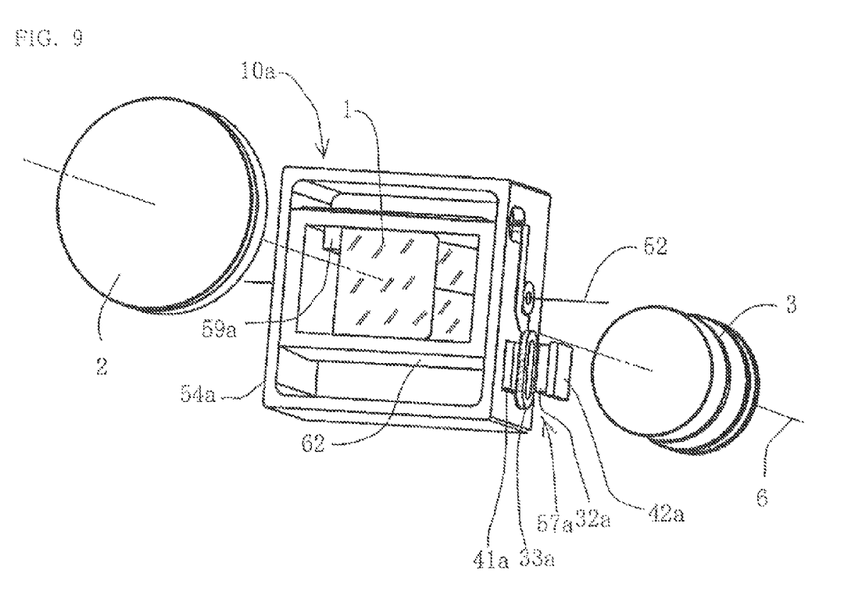
FIG. 9 is a schematic perspective view showing a simplified image stabilizer whose gimbal suspension system has a single axis for pivoting.
Figure 10:
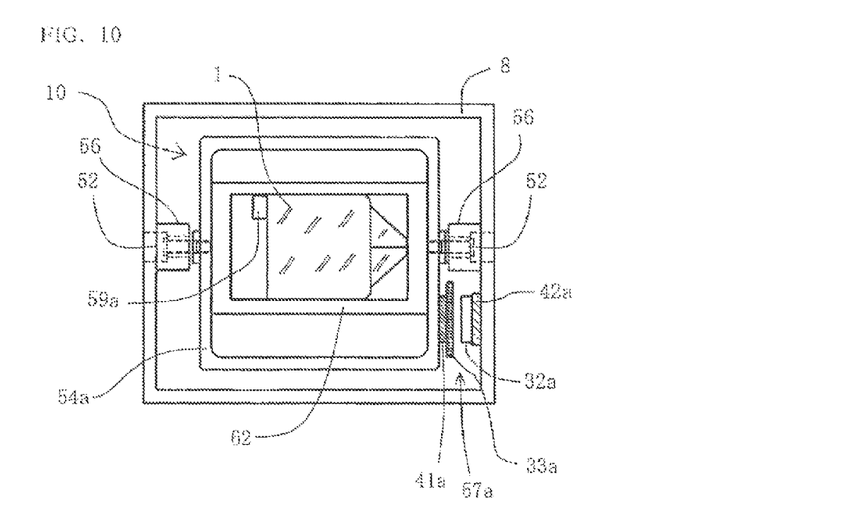
FIG. 10 is an end view of the gimbal suspension system shown in the perspective view of FIG. 9, the end view seen from the side of the objective lens.

A perspective view of another example of the simplified image stabilizer is shown in FIG. 9, and the end view of the stabilizer, seen from the side of the object lens in FIG. 9, is shown as a front view in FIG. 10. The simplified image stabilizer shown in FIG. 10 is capable of compensating for deterioration in the quality of an observed object caused by hands movement in the vertical directions or upward and downward directions. While the image stabilizer shown in FIG. 5 has the biaxial gimbal suspension system with the horizontal pivot shafts and the vertical pivot shafts, the image stabilizer shown in FIG. 10 has a monoaxial gimbal suspension system only with horizontal pivot shafts. The reference numerals in FIG. 10 are the same as the corresponding reference numerals in FIG. 5, which makes the understanding of this embodiment easier.

As shown in FIGS. 9 and 10, an objective lens 2 and an eyepiece 3 are fixed to a case 8, for which reference should be made to FIGS. 1 and 2 because FIG. 9 does not include the case. An erecting prism 1, in alternative embodiment of gimbal suspension system 10a, is fixedly mounted in an erecting-prism holder 54a, only with horizontal shafts 52 around which the erecting-prism holder is capable of pivoting, or movable in upward and downward directions in relation to the case 8.

The erecting-prism holder 54a corresponds to the erecting-prism holder 54 shown in FIG. 5. The erecting prism 1 is fixed to the erecting-prism holder 54a with the aid of an auxiliary member for fixing 62.

The image stabilizer is provided with an angular velocity sensor 59a for detecting hands movement in vertical directions that shakes the case 8, the sensor attached to the erecting prism 1 or the erecting-prism holder 54a in which the erecting prism 1 is fixedly mounted. The image stabilizer is further equipped with a voice coil motor 57a for rotating the erecting-prism holder 54a. The voice coil motor 57a has a first yoke 41a provided with a hollow coil 33a that has a position-sensitive device (not shown in the figure) placed at the center thereof, and a second yoke 42a provided with a permanent magnet 32a. The first yoke and the second yoke are arranged in such a manner that the former faces the latter with a predetermined gap in between and they are movable in relation to each other. The gimbal suspension system 10 is driven in a pivoting manner with this voice coil motor 57a.

A monoaxial angular velocity sensor for detecting hands movements in the vertical directions would suffice for the angular velocity sensor 59a. Also, only the upper one of the circuits for driving the voice coil motors shown in FIG. 7 should be used.

EXPLANATION OF REFERENCE NUMERALS 1 erecting prism
1a, 1b prism
2 objective lens
3 eyepiece
4, 4' monocular
5 a pair of binoculars 6 optical axis
10 gimbal suspension system
31 fixing yoke
32, 33a, 32b permanent magnet
33, 33a, 33b hollow coil
34, 44 gap
35, 43 support
36 position-sensitive device
41, 41a, 41b first yoke
42, 42a, 42b second yoke
51 vertical shafts
52 lateral shafts
53 outer frame
54, 54a erecting-prism holder
55, 56 bearing
57, 58, 56a voice coil motor
59 biaxial angular velocity sensor
59a monoaxial angular velocity sensor
61a power lines
61b position signal lines
62 auxiliary member for fixing

What is claimed is:

1. An image stabilizer applicable to a binocular optical system that comprises an erecting prism placed between an objective lens and an eyepiece, which image stabilizer compensates for deterioration in a quality of an observed image caused by hands movement of a user, the image stabilizer comprising:
   a gimbal suspension system fixed to a case in which the objective lens and the eyepiece are fixed, comprising pivot shafts respectively extending to left and right sides of an optical axis of the binocular optical system, which passes through the objective lens and the eyepiece, wherein the pivot shafts have a common pivot axis perpendicular to the optical axis, and one gimbal suspension system is disposed in each optical axis of the binocular optical system;
   wherein the gimbal suspension system comprising an erecting-prism holder for holding the erecting prism, the erecting-prism holder supported by the pivot shafts so as to be pivotable around the common pivot axis; an angular velocity detector, fixed to the erecting prism or the erecting-prism holder, for detecting an angular displacement of the erecting prism caused by the hands movement; and a voice coil motor for pivoting the erecting-prism holder; the voice coil motor placed off the common axis);
   wherein the voice coil motor comprises:
      a first yoke to which a hollow coil is attached, wherein a position-sensitive device is placed at a center of the hollow coil; and
      a second yoke to which a permanent magnet is attached, wherein the permanent magnet produces a magnetic field whose lines of magnetic force are perpendicular to a face of the first yoke on which the hollow coil is so attached that the position-sensitive device is opposite a central portion of the permanent magnet, on different sides of which different magnetic poles are created;
      wherein the first yoke and the second yoke face each other with a predetermined gap in between, the first yoke and the second yoke are stabilized, with the position-sensitive device and the central portion of the permanent magnet aligned, when no electric current flows through the hollow coil, and the first yoke and the second yoke are movable in relation to each other when an electric current is allowed to flow through the hollow coil.

2. The image stabilizer according to claim 1, wherein the face of the first yoke has a same shape as an opposite face of the permanent magnet attached to the second yoke.

3. The image stabilizer according to claim 1, wherein the first yokes and the second yokes are separate members.

4. The image stabilizer according to claim 1, wherein the position-sensitive device is a Hall element.

5. The image stabilizer according to claim 4, wherein the permanent magnet is a plate-like quadrupole magnet magnetized along a depth thereof in such a manner that different poles are created on the sides of the plate with the central portion of the plate as a border.

6. The image stabilizer according to claim 1, wherein the permanent magnet is a plate-like quadrupole magnet magnetized along a depth thereof in such a manner that different poles are created on the sides of the plate with the central portion of the plate as a border.

7. An image stabilizer applicable to a binocular optical system that comprises an erecting prism placed between an objective lens and an eyepiece, which image stabilizer compensates for deterioration in a quality of an observed image caused by hands movement of a user, the image stabilizer comprising:
   a gimbal suspension system fixed to a case in which the objective lens and the eyepiece are fixed, comprising first pivot shafts respectively extending to left and right sides of an optical axis of the binocular optical system, which passes through the objective lens and the eyepiece, and second pivot shafts respectively extending upward and downward in relation to the optical axis, wherein the first pivot shafts have a first common pivot axis perpendicular to the optical axis, the second pivot shafts have a second common pivot axis perpendicular to the optical axis, and one gimbal suspension system is disposed in each optical axis of the binocular optical system;
   wherein the gimbal suspension system comprises an outer frame with one pair of the first and second pivot shafts, and an erecting-prism holder with the other pair of the first and second pivot shafts; an angular velocity detector, fixed to the erecting prism or the erecting-prism holder, for detecting an angular displacement of the erecting prism caused by the hands movement; and first and second voice coil motors respectively for pivoting the outer frame and the erecting-prism holder; the first and second voice coil motors respectively placed off the first and second common axes);
   wherein each of the first and second voice coil motors comprises:
      a first yoke to which a hollow coil is attached, wherein a position-sensitive device is placed at a center of the hollow coil; and
      a second yoke to which a permanent magnet is attached, wherein the permanent magnet produces a magnetic field whose lines of magnetic force are perpendicular to a face of the first yoke on which the hollow coil is so attached that the position-sensitive device is opposite a central portion of the permanent magnet, on different sides of which different magnetic poles are created;
      wherein the first yoke and the second yoke face each other with a predetermined gap in between, the first yoke and the second yoke are stabilized, with the position-sensitive device and the central portion of the permanent magnet aligned, when no electric current flows through the hollow coil, and the first yoke and the second yoke are movable in relation to each other when an electric current is allowed to flow through the hollow coil.

8. The image stabilizer according to claim 7, wherein the face of the first yoke has a same shape as an opposite face of the permanent magnet attached to the second yoke.

9. The image stabilizer according to claim 7, wherein the first yokes and the second yokes are separate members.

10. The image stabilizer according to claim 7, wherein the first yoke of the first voice coil motor, with the hollow coil at the center of which the position-sensitive device is placed, is fixed to the outer frame of the gimbal suspension system, and the second yoke of the first voice coil motor, with the permanent magnet, is fixed to the case so as to face the first yoke of the first voice coil motor, and wherein the second yoke of the second voice coil motor, with the permanent magnet, is fixed to the erecting-prism holder, and the first yoke of the second voice coil motor, with the hollow coil at the center of which the position-sensitive device is placed, is fixed to the outer frame of the gimbal suspension system so as to face the second yoke of this second voice coil motor.

11. The image stabilizer according to claim 7, wherein the position-sensitive device is a Hall element.

12. The image stabilizer according to claim 11, wherein the permanent magnet is a plate-like quadrupole magnet magnetized along a depth thereof in such a manner that different poles are created on the sides of the plate with the central portion of the plate as a border.

13. The image stabilizer according to claim 7, wherein the permanent magnet is a plate-like quadrupole magnet magnetized along a depth thereof in such a manner that different poles are created on the sides of the plate with the central portion of the plate as a border.

* * * * *